United States Patent Office 3,242,352
Patented Mar. 22, 1966

3,242,352
CHOPPER CIRCUITS
Brian Edward Long, Orpington, Kent, England, assignor to Westinghouse Brake and Signal Company Limited, London, England
Filed July 10, 1962, Ser. No. 208,752
Claims priority, application Great Britain, July 19, 1961, 26,120/61
9 Claims. (Cl. 307—88.5)

This invention relates to chopping circuits and relates in particular to chopper circuits which employ a switching device of the type which is triggered into its conducting state and is rendered non-conducting again by the application of a reverse biassing potential from a storage capacitor.

According to the present invention there is provided a direct current chopping circuit of a type in which the current to a load is switched via a unidirectional conductive switching device which is rendered conducting in the forward direction on application of a triggering signal thereto and is rendered non-conducing by the application of a reverse voltage from a storage capacitor and wherein said storage capacitor is so disposed in the circuit that when it is connected across said switching device to render the latter non-conducting it is also connected in an oscillatory circuit having a fixed inductance via which the load current flows whereby the capacitor charges to a peak potential which increases with the load current.

In a preferred embodiment of the invention when said capacitor is connected across said switching device to render it non-conducting via a further switching device an inductance in a unidirectional current path to the output terminals causes the capacitor to reverse its charge via a low impedance alternating current path in parallel with output terminals the charge on said capacitor being subsequently reversed via an oscillatory current path in parallel with the first mentioned switching device when the latter is triggered.

Figure 1:
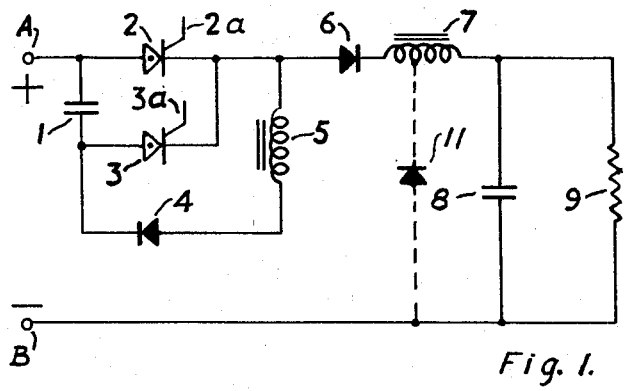
Figure 2:
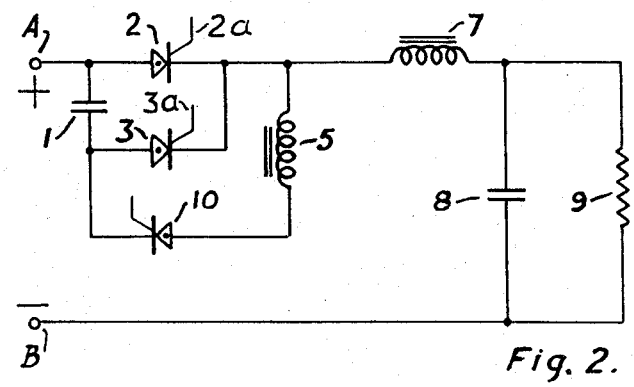
Figure 3:
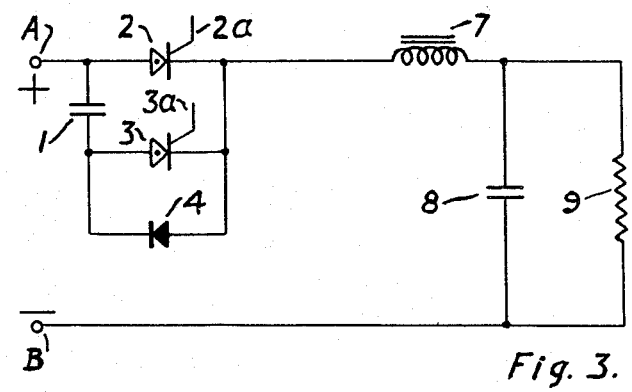

In order that the invention may be clearly understood and readily carried into effect, the same will be further described with reference to the accompanying drawings in which FIGURES 1, 2 and 3 illustrate by way of example only, three embodiments of the invention.

Referring to FIGURE 1, a positive D.C. source terminal A is connected to a controllable rectifier switching device 2, which can be triggered into its conducting state by the application of a triggering control pulse at 2a. The output of 2 is connected via a similarly poled rectifier 6 and an inductance 7 to one terminal of a load 9, the other terminal of which is connected to the negative source terminal B. In parallel with 2 there is connected a unidirectional oscillatory current path comprising a capacitor 1, rectifier 4 and inductance 5. Capacitor 1 is provided with a further controllable rectifier switching device 3 for connecting it when desired across 2. A low impedance A.C. path, the purpose of which will be understood hereafter, in parallel with 9, is provided by means of a capacitor 8.

In operation of the arrangement of FIGURE 1, it is assumed that there is available a source of any suitable known form, of triggering pulses to be applied to 2 and 3 at 2a and 3a to determine the mark to space ratio of the chopped output current applied to 9. It is to be understood further that capacitor 1 is initially charged to the supply source potential, the plate which is connected to 3 and 4 being negative with respect to the other plate. When 2 is triggered the circuit via 2, 6, 7, 9 and the source is completed, together with the circuit via 2, 5 and 4 from 1. A load current therefore builds up in 9. Further, an oscillatory current flows from 1 via 2, 4 and 5 which forms a series oscillatory circuit but 4 allows this current only to flow in one direction with the result that the charge on 1 is reversed. The plate of 1 connected to 3 therefore becomes positive relative to A and the flow of current to 9 is unaffected. When 3 receives a triggering pulse, the charge on 1 is applied as a reverse bias to 2 which is therefore rendered non-conducting. However by virtue of the presence of 7, an oscillatory current continues to be drawn for one half cycle from 1 via 3, 6, 7 and the low impedance A.C. path through 8. At the end of this half cycle of the oscillatory circuit including 1 and 7, the current through 3 tends to reverse and 3 is rendered non-conducting. The capacitor 1 is therefore left in a charged condition in which the plate connected to 3 and 4 is negative relative to B. The charge will be greater than the initial charge to an extent depending on the load current. It will be understood moreover that although the magnitude of the charge on 1 can vary with the load, the charging time constant for 1 is completely independent of the load, being dependent solely upon the internal circuit parameters of the chopper circuit arrangement itself.

By controlling the period between triggering of 2 and triggering of 3 relative to that between triggering of 3 and triggering of 2 the ratio between the "ON" and "OFF" periods of transistor 2 is controlled, hence also the energy delivered to the load resistor 9. Moreover the presence of the large value capacitor 8, which is necessary for the action of the complete circuit has the advantage that the voltage appearing across the load 9 is considerably smoothed.

The circuit arrangement shown in FIGURE 2 is a modification of that described above, the rectifier 6 being omitted and 4 being replaced by a controllable rectifier switching device 10 similar to 2 and 3. The circuit details need not be described further as it is in other respects the same as FIGURE 1.

In operation of the circuit illustrated in FIGURE 2, the device 10 is triggered simultaneously with 2 so that the charge reversing action on 1 in the circuit including 1, 2, 8 and 10 is identical to that described above, as is also the action when 3 is triggered. At the termination of this action, when the plate of 1 which is connected to 3 and 10 becomes more negative than the negative supply potential, 10 is forward biassed but unlike 4 in FIGURE 1, 10 cannot conduct unless it is triggered. This obviates the necessity for the rectifier 6, which is an advantage as it may be undesirable to have such a rectifier in the main current supply.

The circuit arrangement can be further modified to provide the simpler form of circuit illustrated in FIGURE 3. In FIGURE 3, the inductance 5 and the diode 6 of FIGURE 1 are omitted but in other respects the circuit again remains the same as FIGURE 1. In operation, the capacitor 1 is initially charged so that the plate connected to 3 and 4 is positive relative to A. When 2 is triggered, a load current builds up in the circuit 2, 7 and 9 via the supply. Switching device 3 is subsequently triggered thus connecting 1 directly across 2 to reverse bias it and render it non-conducting. However, 1, 3, 7, and the low impedance A.C. path through 8, form an oscillatory circuit and current is drawn from 1 via 3 causing the plate connected to 3 to become negative relative to A, until the current tends to reverse. At this point 3 is reverse biassed and therefore becomes non-conducting. However a path in the reverse direction still exists through 4 so the oscillatory current continues for a further half cycle via 4. At the end of this half cycle, the current ceases leaving a charge on 1, of the same polarity as the initial charge and the circuit is ready to repeat the action.

The operation of the circuits illustrated in FIGURES 1, 2 and 3 is dependent upon the supply source presenting an effectively low impedance, which requirement may be met in practice by connecting a large capacitor between the terminals A and B.

As indicated above, the magnitude of the potential to which the storage capacitor 1 charges, in operation of the above circuit arrangements, is dependent upon the magnitude of load current which flows in 2 and therefore the higher the load current, the greater is the biassing potential to which 2 is subjected to render it non-conducting. Further, the time that 2 remains reverse biassed when being rendered non-conducting by the action of the circuit is independent of the load and can be arranged to be of optimum value.

It may in certain applications of circuits according to the invention be desirable to limit the voltage to which a biassing capacitor such as 1 is allowed to charge. This can be achieved in a number of different ways but a convenient way consists of connecting an intermediate point on the inductance 7 via a diode such as 11 shown with dotted connections in FIGURE 1, poled in such a sense as to tend to prevent flow of current between A and B, to the point B. If such a diode is included say, in FIGURE 1, the operation of the circuit is the same as described above, up to the point where 3 is triggered. At this point, the plate of 1 which is connected to 3 is at a positive potential, greater than that of A and 2 is biassed in the reverse direction to render it non-conducting as above. Capacitor 1 then continues to discharge via 6, 7 and 8. One terminal of 7 is held at the steady potential of the plate of 1 connected to A while the other terminal of 7 is connected via 6 and 3 to the other plate of 1. This plate is steadily falling in potential, becoming negative as the energy in 7 is transferred to 1. The above mentioned tapping point on 7 is also falling in potential and continues to do so until the tapping point reaches zero volts, after which time the additional diode becomes forward biassed and further action of the circuit containing 1, 3 and 6 is inhibited. Thus the negative potential to which 1 discharges is limited in dependence upon the tapping point on 7 at which the additional diode is connected. It will be noted furthermore that the additional diode only comes into action if the circuit constants are such that the energy stored in 7, due to the load current, is more than sufficient to drive the plate of 1 connected to 3 to the required negative potential.

Since in all the above described circuit arrangements, a capacitor 8 is provided across the load 9, this capacitor provides smoothing for the output voltage and an additional filter may be unnecessary for many purposes. Such a filter may however be used if desired without affecting the operation of the circuit.

In the foregoing description of the circuits of FIGURES 1, 2 and 3, it has been assumed that a desired voltage is initially present across the storage capacitor 1 to enable the circuits to commence operation. However it will be appreciated that if the circuits are left unoperated for some time, the charge on 1 may leak away and starting may not appear to be possible. Starting is however always assured in the circuits of FIGURES 1 and 2 if it is arranged that after switching on the supply, 3 is always triggered before 2. This enables the appropriate charge to be built up on 1 from the D.C. supply. In the case of the circuit of FIGURE 3 however although not shown, it is desirable to provide a switch which is operated on starting which momentarily reverses capacitor 1 across the supply terminals to enable the lower plate of 1 to be set to a potential which on starting is positive relative to the positive supply terminal.

Chopping circuits such as described are as indicated above unaffected by the value of the load resistance and once in operation the circuits continue to operate however much the load resistance is increased or decreased provided that the maximum and minimum conduction times of the main switching device 2 does not fall outside the limits which are determined by the charge and discharge times of the storage capacitor.

Having thus described our invention what we claim is:

1. A direct current pulse modulation switching circuit comprising two direct current input terminals and a load connected thereto, a first path from a said terminal to the load including an inductance and a controlled rectifier, a second path connected across said controlled rectifier and including in series a commutating capacitor and a second controlled rectifier, a third path connected across said second mentioned controlled rectifier and including rectifying means poled in the reverse direction to said first and second controlled rectifier oscillatory circuit means comprising said commutating capacitor, said second controlled rectifier and said inductance for providing a substantially undamped oscillation having a peak voltage value and operative when said second controlled rectifier is triggered to place a charge equal to said peak voltage value on said commutating capacitor, and blocking circuit means for holding said charge on said capacitor.

2. A circuit as claimed in claim 1, wherein a further inductance is included in said third path.

3. A circuit as claimed in claim 1, wherein said rectifying means in said third path is a diode, and said blocking circuit means comprises a further diode in said first path.

4. A circuit as claimed in claim 1, wherein said rectifying means comprises a third controlled rectifier adapted to be rendered conducting with said first mentioned controlled rectifier, and said blocking circuit means comprises said third controlled rectifier.

5. A circuit as claimed in claim 1, said inductance being connected between the terminal of said first mentioned rectifier, remote from the corresponding supply terminal and the corresponding output terminal.

6. A circuit as claimed in claim 1 wherein a tapping point on said inductance is connected via a rectifier to a point of reference potential to limit the peak voltage to which said capacitor can be charged.

7. The switching circuit of claim 1, said oscillatory circuit means further including means providing a low impedance alternating current path across said load, whereby the charging time of said commutating capacitor is substantially independent of the load impedance.

8. The switching circuit of claim 1, further comprising second oscillatory circuit means including said commutating capacitor, said first controlled rectifier, said rectifying means, and a further inductance in said third path for reversing the polarity of said charge on said commutating capacitor when said first controlled rectifier is triggered.

9. The switching circuit of claim 1, wherein said charge is of the same polarity as said direct circuit input terminal connected to said first path and wherein said rectifying means comprises a diode in said third path and said blocking circuit means comprises said diode.

References Cited by the Examiner
UNITED STATES PATENTS
3,074,008   1/1963   McPhail et al. ___ 307—88.5 X

OTHER REFERENCES

General Electric Controlled Rectifier Manual: 1960, 1st ed., pages 71 to 73, 106, 112 and 113 relied on.

DAVID J. GALVIN, *Primary Examiner.*

ARTHUR GAUSS, *Examiner.*